(12) United States Patent
Piatko et al.

(10) Patent No.: US 8,252,358 B2
(45) Date of Patent: Aug. 28, 2012

(54) STABLE PROTEIN-FREE WHIPPABLE FOOD PRODUCT

(75) Inventors: Michael Piatko, West Seneca, NY (US); Cheryl Perks, Ridgeway (CA)

(73) Assignee: Rich Products Corporation, Buffalo, NY (US)

( * ) Notice: Subject to any disclaimer, the term of this patent is extended or adjusted under 35 U.S.C. 154(b) by 1095 days.

(21) Appl. No.: 11/868,166

(22) Filed: Oct. 5, 2007

(65) Prior Publication Data

US 2008/0085353 A1    Apr. 10, 2008

Related U.S. Application Data

(60) Provisional application No. 60/850,166, filed on Oct. 6, 2006.

(51) Int. Cl.
*A23L 1/05* (2006.01)
(52) U.S. Cl. ........................... 426/564; 426/572
(58) Field of Classification Search .................. 426/564, 426/572
See application file for complete search history.

(56) References Cited

U.S. PATENT DOCUMENTS

| | | | |
|---|---|---|---|
| 2,868,653 A | 1/1959 | Diamond et al. |
| 3,843,805 A | 10/1974 | Powell |
| 3,924,018 A | 12/1975 | Sims et al. |
| 4,146,652 A | 3/1979 | Kahn et al. |
| 4,310,561 A | 1/1982 | Buddemeyer et al. |
| 4,331,689 A | 5/1982 | Shemwell |
| 4,341,811 A | 7/1982 | Rule |
| 4,390,550 A | 6/1983 | Kahn et al. |
| 4,407,838 A | 10/1983 | Rule et al. |
| 4,460,617 A | 7/1984 | Barndt et al. |
| 4,492,714 A | 1/1985 | Cooper et al. |
| 4,770,892 A | 9/1988 | Grealy et al. |
| 4,857,341 A | 8/1989 | Tran et al. |
| 5,609,904 A | 3/1997 | Koh et al. |
| 5,711,986 A | 1/1998 | Chiu et al. |
| 6,203,841 B1 | 3/2001 | Lynch et al. |
| 6,235,894 B1 | 5/2001 | Kettlitz et al. |
| 6,277,429 B1 | 8/2001 | Zeller et al. |
| 6,455,512 B1 | 9/2002 | Ward |
| 2002/0119238 A1 | 8/2002 | Pires |
| 2004/0033302 A1 | 2/2004 | Shah et al. |
| 2004/0265468 A1 | 12/2004 | Perks et al. |
| 2005/0031764 A1 | 2/2005 | Pires |

FOREIGN PATENT DOCUMENTS

| | | | |
|---|---|---|---|
| JP | 2003158998 A | * | 6/2003 |
| WO | WO 0148024 A1 | * | 7/2001 |

OTHER PUBLICATIONS

Deng, L., et al., Preparation and Study on Application of Starch Ester Octenyl Succinate (Purity Gum), Food Science and Technology, Dec. 31, 2002, vol. 11, pp. 39-40.

* cited by examiner

*Primary Examiner* — Jyoti Chawla
(74) *Attorney, Agent, or Firm* — Hodgson Russ LLP

(57) ABSTRACT

The present invention provides a substantially protein-free whippable food product having improved stability characteristics without detectable change in the organoleptic characteristics. The product comprises triglyceride fat, one or more sugars, an emulsifier component, a starch component comprising one or more NOSA starches and one or more hydrophilic starches, and optionally an acid component. This product can be stored frozen or at ambient temperatures for extended periods of time and can also be whipped and displayed at ambient temperatures.

14 Claims, No Drawings

STABLE PROTEIN-FREE WHIPPABLE FOOD PRODUCT

CROSS-REFERENCE TO RELATED APPLICATION

This application claims priority to U.S. Provisional application No. 60/850,166, filed on Oct. 6, 2006, the disclosure of which is incorporated herein by reference.

FIELD OF THE INVENTION

The present invention relates generally to the field of whippable food products and more particularly to a substantially protein-free whippable food product having improved stability characteristics at ambient temperatures and freezer temperatures, as well as improved performance characteristics.

DISCUSSION OF RELATED ART

Whippable food products are commonly used as toppings, icings, fillings and the like for cakes and other desserts. Different approaches have been used to obtain formulations that possess desirable characteristics including longer storage life, shelf life of both unwhipped and whipped products, ease of preparation and use of the whipped product, stability and performance characteristics; the conditions under which whipping can be performed including the whipping temperature; display temperature and display time; and the ease of spreading of the whipped product etc.

It has been suggested that selection of emulsifiers, stabilizers, water-soluble solids including sweeteners and inorganic salts, proteins and fats is key to the preparation of such whippable products that possess the desired characteristics and at the same time appeal to the consumer. In these formulations, typically, vegetable oils or fats are used and milk or other protein is added to provide taste and stability. Proteins are generally considered to contribute to the stability of the liquid formulation and the whipped formulation as well as to the ease of whipping the liquid formulation. However, the use of milk proteins or other proteins, results in products that can denature at acidic pH or increased temperatures. Additionally, complexation with multivalent metal ions can lead to precipitation or gelling of proteins. Another problem with formulations containing proteins is that they are susceptible to microbial attack thereby limiting the storage of such formulations to certain conditions.

Attempts to formulate products in the absence of proteins include the use of up to 3 weight percent of di or trivalent metal salts (EP 0509579B1 and EP 0691080 A2). This can lead to taste problems and can also cause crosslinking of ionic thickeners, which in turn can adversely increase the viscosity of the product.

Several patents describe the use of cellulosic gums to replace proteins in whippable toppings. These include U.S. Pat. No. 2,868,653 to Diamond et al., U.S. Pat. No. 4,770,892 to Grealy et al., and U.S. Patent application publication numbers 2002/0119238A1 and 2995/0031764A1 to Pires. However, such replacements have not been found to be suitable for compositions comprising high solids.

Attempts have also been made to replace proteins in other food products such as coffee whiteners. These attempts are directed to replacement of protein with octenylsuccinic anhydride (NOSA) starches. Such products are provided in U.S. Pat. Nos. 4,492,714; and 4,460,617. However, similar protein-free whippable products are not available.

Accordingly, there is an ongoing and unmet need in the area of toppings and icings for protein-free whippable products, which have improved structural and microbial stability at ambient temperatures and upon whipping, and which can be stored frozen and yet have desirable organoleptic characteristics.

SUMMARY OF THE INVENTION

The present invention provides whippable oil in water emulsion food product which is substantially protein-free, can be prepared from commercially available ingredients and which extends the distribution and use temperatures for the unwhipped as well as the whipped products. This product has improved microbial stability without sacrificing whippability and structural stability of the whipped product.

The whippable food product of the present invention has good organoleptic and stability characteristics. The product can be stored at −20° C. to −10° C. for at least a year. The product can be whipped from about 7° C. to about 15° C. and whipped product can be used or displayed at up to 25° C. for up to 7 days to obtain confections including icings, toppings, fillings and the like on various food products such as cakes, desserts etc The whippable food product of the present invention comprises a microbially-stable oil in water emulsion of a triglyceride component, water, sugar component, emulsifier component in an amount sufficient to stabilize the product, and a starch component comprising one or more NOSA starches and one or more hydrophilic starches The whippable food product may also comprises salts and buffers, anti-oxidants and flavors etc. The product is substantially free of proteins. The term "substantially free of proteins" or "substantially protein free" as used herein means that proteins are less than 0.1% by weight of the composition. Thus, while no protein may be added to the formulation, it is recognized that some ingredients (such as flour) may contain trace amounts of protein.

The present invention is based on the surprising findings that by using NOSA starches in combination with hydrophilic starches, it has been possible to formulate a substantially protein-free whippable product with improved stability as described herein.

The triglyceride component comprises one or more fats. Suitable fats include palm kernel oil, coconut oil, babassu oil, tucum oil, palm oil, cottonseed oil, soybean oil, canola oil, sunflower oil, safflower oil, lard, tallow, or a stearine fraction thereof or hydrogenated fractions thereof. The triglyceride component of the present invention does not require both a hardening as well as a non-hardening fat. Rather, a single fat component is sufficient.

Because the composition is essentially protein-free, acids can be added to increase its microbial stability. Thus, while the present unwhipped product can have a formulation at around normal pH (6-8), it can also have an acidic pH (i.e., pH lower than 7.0). Thus, in various embodiments, the pH can vary between 2.5 to 8.0. In one embodiment, it has a pH of less than 4.6 to provide high microbial stability. In another embodiment, the pH can be lowered to anywhere between 3 and 4.6 and the product can be stored at ambient temperatures for at least 7 days without developing an off-taste due to bacterial activity.

The microbial stability of the composition can also be increased by lowering the water activity of the composition such that it is within range of 0.75 to 0.93 and preferably 0.8 to 0.9. One exemplary method for reducing water activity in the composition is to raise the sugar solids in the composition.

Thus, in one embodiment, provided is a whippable, protein-free composition with high microbial stability and high sugar solids and/or dissolved solids e.g., (sugars in the range of from 30 to 45 wt % of the composition) which can be exposed to ambient temperatures for as long as 7 days without developing off-tastes due to bacterial activity. Thus, this invention provides substantially protein-free formulations which have high total solids in the range of 55-75% and therefore do not need the reduced pH to provide microbial stability and it also provides substantially protein-free formulations which have low total solids in the range of 35-54% with low pH in the range of 2.5 to 4.6 so as to provide microbial stability. Because the formulations are substantially protein-free, this enables the addition of fruits or fruit juices to the product. The addition of fruits and/or fruit juices enhances the flavoring of the whippable product as well as provides microbial stability due to lowering of the pH.

This invention also provides a method for obtaining a whippable food product having improved ambient shelf-life stability characteristics. The method comprises the steps of blending the dry ingredients and some emulsifiers in an aqueous solution in warm water. A fat phase is prepared by heating the fat and adding remaining emulsifiers to the fat phase. The oil and aqueous phases are mixed and blended. The product is heated to provide a commercially sterile product and then homogenized and further cooled to achieve desired stability.

The whippable product provided herein can be whipped by routine methods known in the art to form a whipped confection. The whippable product may be whipped with or without additional ingredients such as various forms of sugars. The product can be whipped to an overrun of up to about 500% at temperatures up to 15° C.

DETAILED DESCRIPTION OF THE INVENTION

This invention provides a substantially protein-free, whippable food product having improved stability of the unwhipped product (such as with respect to emulsion breakdown, gelation or inversion and storage at freezer temperatures) as well as of the whipped confection produced therefrom (such as with respect to cracking, weeping, bulging, sagging or sliding off a cake, or detectable loss of organoleptic characteristics). The unwhipped food product of the present invention can be easily stored frozen and after thawing, can be whipped and displayed at ambient temperatures.

This invention provides in particular for certain whipped products and confections having improved microbial stability, desirable organoleptic characteristics and the ability to contain particular additives such as fruits and/or fruit juices without adversely affecting the stability. Although not intending to be bound by any particular theory, it is believed that the particular combinations of the ingredients including the combination of the NOSA starch and the hydrophilic starch contributes to the substantial performance improvements as described herein Representative characteristics and specific improvements (and combinations of improvements) for whipped food products and confections that are achieved according to the practice of the invention include a) the product may be whipped with or without additional ingredients such as sugar, powdered sugar, liquid sugar and the like.

b) the unwhipped product can be stored from −20° C. to −10° C. for about a year.

c) the whipped product is a dessert whipped topping, icing or filling with desirable taste and mouth characteristics.

d) the whipped product can be prepared from 7° C. to 15° C.

e) the whipped product can be used/displayed at temperatures up to 25° C. as a topping, icing or filling for cakes, desserts etc. for up to 7 days without any appreciable cracking, weeping, bulging, sagging or sliding off the cake or dessert.

f) it can be whipped to an overrun of up to 500%. Generally the overrun obtained is between 150 to 500%. Overrun (%) is defined as the liquid weight/volume divided by foam weight/volume g) the water activity for formulations comprising high total solids is 0.8 to 0.9 and the water activity of formulations comprising low total solids is 0.91 to 0.98.

h) the whippable product has both one or more NOSA starches and one or more hydrophilic starches. The ratio of the NOSA starch to the hydrophilic starch is in the range of 1:2 to 2:1, with a ratio of 1:1.5 being preferred.

i) the product can contain fruits or fruit juices. When the product contains fruits or fruit juices, the whippable product can be stored for at least up to seven (7) days at temperatures up to 25° C. The fruit or fruit juice can be directly added at levels up to 25 wt % which reduces the pH down to 3.0 to 3.5. Fruits and/or fruit juices can be added to formulations containing low solids as well as to formulations containing high solids.

j) the product can have increased microbial stability either by using high solids without reducing the pH or can have increased stability using low solids with reduced pH. The pH can be reduced by addition of acidulants or by addition of fruits and/or fruit juices.

k) the whippable food product is pourable. The whippable product of this invention has a viscosity of less than 3,000 cP. In one embodiment, the viscosity is less than 2,000 cP and is preferably between 400 and 1,000 cP.

l) the whipped product with or without added fruit (fruit pieces or fruit juices) can be stored frozen for at least one year.

The various ingredients of this product are provided below.

Fats

The triglyceride fat component contributes to the stability of the product. The fats useful for the present invention include palm kernel oil, coconut oil, babassu oil, tucum oil palm oil, cottonseed oil, soybean oil, canola oil, sunflower oil, safflower oil, lard, tallow, or a stearine fraction thereof or hydrogenated fractions thereof.

Starches

It has been found that despite the present formulation being substantially free of a protein component, when certain starches are included in the composition, the composition can form a whipped product which is structurally stable at ambient temperatures for at least 7 days. The starches useful for the formulation are those which have been modified with octenyl succinic anhydride (generally referred to as NOSA starches or OSAn Starches). Such starches are commercially available and include but are not limited to National Starch's Purity Gum and Tate & Lyle's STACAP lines. Further, U.S. Pat. No. 6,455,512 and EP patent no. 0332027 describe the preparation of the NOSA starches.

It was, however, observed that the inclusion of the NOSA starches alone produced a product that was too soft. The product was therefore difficult to use for decoration and the decoration was difficult to maintain over time. Inclusion of NOSA starch with gelling starch did not produce any improvement. However, it was surprisingly observed that inclusion of NOSA starch with hydrophilic starch produced a desirable product.

Therefore, the whippable product also contains hydrophilic starch such as hydroxy propyl substituted starch. The addition of hydrophilic starches produced a product which had consistent and desired viscosity. Such starches are commercially available. Examples of commercial sources of hydroxy-propylated starches include Tate & Lyle's LoTemp series.

Accordingly, the composition of the present invention contains in the range of from 0.1 to 4.0 wt % starches having both NOSA starch and hydrophilic starch. The ratio of the NOSA starch to the hydrophilic starch is in the range of 1:2 to 2:1, with a ratio of 1:1.5 being preferred.

The combination of nOSA starches and hydrophilic starches impart to the whippable composition a degree of emulsifiability, whippability, stability and provide body to the whipped product as well as water binding ability.

Emulsifiers

A wide variety of emulsifiers may be employed in amounts on the same order as generally known in the art of oil-in-water emulsions, for example, about from 0.1% to 3%, preferably about from 0.4% to 1.0% as permissible under FDA guidelines. Suitable emulsifiers include lecithin, hydrolyzed lecithin; mono, di, or polyglycerides of fatty acids, such as stearine and palmitin mono and diglycerides, polyoxyethylene ethers of fatty esters of polyhydric alcohols, such as the polyoxyethylene ethers of sorbitan monostearate (Polysorbate 60) or the polyoxyethylene ethers of sorbitan monooleate (Polysorbate 80); fatty esters of polyhydric alcohols such as sorbitan monostearate or tristearate; polyglycerol esters of mono and diglycerides such as hexaglyceryl distearate; mono- and/or diesters of glycols such as propylene glycol monostearate, and propylene glycol monopalmitate, succinoylated monoglycerides; and the esters of carboxylic acids such as lactic, citric, and tartaric acids with the mono- and diglycerides of fatty acids such as glycerol lacto palmitate and glycerol lacto stearate, and calcium or sodium stearoyl lactylates and all members of the sucrose ester family thereof, all varieties of diacetyltartaric esters of fatty acids, "DATEMS", and the like, and mixtures thereof.

The emulsifier component of the present invention may also include one or more hydrophilic colloids as stabilizing emulsifiers. These include methylcellulose, carboxy-methylcellulose, hydroxy-propylcellulose, hydroxy-propylmethylcellulose, and microcrystalline cellulose.

Thickeners/Gelling Agents

Some gums are useful as thickeners/gelling agents. Those skilled in the art will recognize that these thickeners/gelling may also act as stabilizers and emulsifiers. These gums could be natural such as plant gums or animal gums. Useful gums for this invention are gelatins, pectins, alginates, agars, carrageenans, locust beans, guars, xanthans, gellans and konjac gums. Typically, a gum or combination of gums is employed with a sugar, e.g. dextrose, carrier. The amount of these gums can be varied widely in accordance with the amounts known in prior art compositions, generally about from 0-2%, preferably about 0.1-0.5% as permissible under FDA guidelines.

Sugars

The sugars (or sweeteners) useful for the present invention include monosaccharides, disaccharides, polysaccharides, dextrins, maltodextrins and polyols. The sugars may be reducing or non-reducing sugars. The sugar component may comprise one or more sugars, such as sucrose, fructose, dextrose, trehalose, and/or sugar syrups, such as corn syrups, and/or intensive sweeteners, such as acesulfame, thaumatin aspartame, alitame, saccharin, cyclamates, and trichloro sucrose. Other typical sweetener/bulking agents include maltodextrin and polyols such as: polydextrose, maltitol, erythritol, xylitol, mannitol, isomalt, lactitol, glycerin, propylene glycol and sorbitol. For formulation calculations, all of these materials are considered to be included in the sweetener component. For taste purposes and for ease of operation, the sweetener component normally comprises sucrose or sucrose-sorbitol combinations.

In previous protein containing formulations, an increase in microbial stability was achieved by the inclusion of a high proportion of sugar solids in the composition. The present formulation can have low sugar solids but are still microbial stable due to the addition of the acid. Acid can be added without compromising stability because the formulation is substantially free of proteins. The present formulation can also have high solids. Thus, the sugar solids content of the present invention can be such that the water activity is in the range of from 0.8 to 0.9 (high solids) or 0.91 to 0.98 (low solids).

Salts

The salts useful for the present invention are any edible salts that do not interfere with other ingredients or render an undesirable taste. Salts generally act as buffers and sequestrants. Sequestrants are considered to combine with polyvalent metal ions to form soluble metal complexes that improve the quality and stability of foods and food emulsions. Examples of useful salts are common salt (sodium chloride), and sodium, calcium and potassium: monophosphates, diphosphates, polyphosphates, citrates, chlorides, and the like.

Acidulants

Acidulants can be added to control pH, serve as a preservative and/or to attenuate sweetness, flavor and/or browning. Examples of acidulants suitable for the present invention are acetic acid, ascorbic acid, lactic acid, phosphoric acid, tartaric acid, malic acid, citric acid, gluconic acid, fumaric acid, sodium acid sulfate and the like. It is preferable to use acidulants so as to maintain a pH range of between 2.5 to 4.6.

Anti-Oxidants

In one embodiment of the invention, the formulation also comprises anti-oxidants such as citric acid, phosphates, rosmaric acid, spice extracts and the like. This also helps in chelating metal ions.

Other Ingredients

Other ingredients that are useful for the present invention include flavoring agents, colorants, vitamins, minerals, etc. Suitable flavoring agents can be employed to impart vanilla, cream, chocolate, coffee, maple, spice, mint, butter, caramel, fruit and other flavors.

Fruits and Fruit Juices

The acidic pH of the whippable product allows the use of real fruits and fruit juices in the formulation. Additionally or alternatively, pieces of real fruits can also be added. Accordingly, the term "fruit" as used herein refers to real fruits, pieces thereof, juices therefrom, dried forms of such fruits or combinations of the above. Fruits can include berries including strawberries; peaches; nectarines; citrus fruits including limes, oranges; bananas and the like. The product may be whipped with or without the fruits or fruit juices and then fruit can be added to it, or the fruit can be blended with it during or before whipping. Preferably, the fruit pieces should blend smoothly and should not be pulpy.

The range of total fats in the present product is 10-40%, preferably between 20-30%. The sugars solids are between 10-60%, preferably between 20-40%. The water is between 20-70% preferably between 20-40%. Various flavors can be added to the product with the range depending upon the required flavor profile.

The following table (Table 1) provides the ranges of various ingredients of the whippable product according to the present invention.

TABLE 1

| Ingredient | Range | Preferred |
|---|---|---|
| Water | 20% to 70% | 20% to 40% |
| Gums | 0.1% to 2% | 0.2% to 0.6% |
| Salts | 0.1% to 1% | 0.1% to 0.5% |
| Preservatives | 0 to 2% | Optional |
| Emulsifiers | 0.1 to 3% | 0.4% to 1.0% |
| Flavors | 0 to 1% | Optional |
| Sugars | 10%-60% | 20% to 40% |
| Starch | 0.1 to 4.0 | 0.6 to 2.0 |
| Acids | 0 to 1% | Optional |
| Fats | 10-40 | 20-30 |

To prepare the product, the dry ingredients are added to hot water (at about 75° C.). Sugars or sugar solutions are then added to the aqueous phase and the temperature is allowed to equilibrate to about 75° C. allowing the ingredients time to dissolve and mix. The fat phase (~65° C.) is added along with the lipophilic ingredients and mixed at high speed until a homogenous mixture is formed. The resulting mixture is processed to achieve a desired level of microbial destruction so as to produce a pasteurized product.

The mixture is homogenized to a pressure of 100 to 1000 bar (preferably 200 to 600 bar) and then pre-cooled to 30° C.-60 C, preferably to 40° C. to 50° C. with a final cool to 5° C. to 20° C., preferably to 5° C. to 15° C. The resultant mixture is then packaged. The product can also be made and packaged aseptically.

The whippable product produced according to the above method can be stored and distributed in a frozen form or can be stored and distributed in a refrigerated form.

To obtain a whipped confection, the whippable product of the present invention can be whipped using a paddle, whip, traditional batch mixers or continuous mixers (e.g., Hobart, Kitchen Aid, Kenwood, Oakes, Mond Mixers, Treffa, CR mixers etc), aeration devices including continuous mixers and the like.

The whippable product can be whipped to an overrun of up to 500%. Typically the overrun is about 150 to 500%. While temperature plays a role in the final overrun, the product can be whipped in about 4-15 minutes at refrigeration temperatures (about 4° C.-15° C.). The whipped product is stable at ambient temperatures for up to 7 days without loss of acceptability.

A variety of whipped confections can be made from the product of this invention. Such confections include fillings, icings, toppings, decorations and the like which can be used for cakes, pies, cookies and the like. The toppings, icings and fillings are used according to routine methods. Further, the whipped product of the present invention may be used with other components to provide for desired toppings, icings or fillings.

In addition to the microbial stability of the product, another advantage is the ability to add fruit and/or fruit juice to the product without affecting the emulsion.

The following illustrative examples further describe this invention.

EXAMPLE 1

Tables 2 and 3 provide examples of formulations for the present invention. Formulation #1 contains protein is not amenable to addition of fruit during processing or to the liquid before whipping. If fruit and/or fruit juice or acid is added to the formulation containing protein (Formulation 1), the product thickens into a thick paste like structure within seconds. Formulations 2 and 4 are examples of the present invention and examples 3 and 5 have fruit juice or fruit concentrate added to Formulations 2 and 4 respectively, either during processing as in the examples or to the finished liquid.

In comparing the various formulations, the performance of the unwhipped whippable product as well as of the whipped product was evaluated. For the unwhipped product, the whip time, penetrometer, bag time as well as overrun were measured.

Acceptable formulations displayed: a whip time of 5-15; overrun of 250-400 (with around 300 being preferred); penetrometer reading of 30-52 mm (with 30-45 being preferred); and a bag time of 30 or above. All the performance tests were conducted using standard procedures accepted in the art.

With respect to the appearance of the whipped product on a cake after 7 days at 78 C, evaluations were done by visual inspection. Acceptable formulations displayed: slight to moderate roughness; none to slight cracking; slight to moderate air coalescence; none to slight syneresis and none to slight sagging/bulging/sliding off.

As can be seen in Table 3, formulations 2-5 which did not contain any sodium caseinate, but contained NOSA starch and hydrophilic starch showed desirable performance which was comparable to the performance of the formulation comprising sodium caseinate (Formulation 1).

In Formulations 2-4, the NOSA starch used was STACAP 661 from Lyle & Tate. Similar results were obtained using other NOSA Starches such as National 46, National 912 and N-LOK, and Emplex from Cargill.

TABLE 2

|  | FORMULATION 1 | FORMULATION 2 | FORMULATION 3 | FORMULATION 4 | FORMULATION 5 |
|---|---|---|---|---|---|
| PALM KERNEL OIL | 24 | 24 | 24 | 20 | 20 |
| NOSA starch (STACAP661) | 0 | 0.4 | 0.4 | 0.4 | 0.4 |
| Hydroxy-Propyl Starch (LOTEMP 452) | 0 | 0.6 | 0.6 | 0.6 | 0.6 |
| SODIUM CASEINATE | 1.25 | 0 | 0 | 0 | 0 |
| CARAGEENAN | 0 | 0.1 | 0.1 | 0.1 | 0.1 |
| XANTHAN GUM | 0.04 | 0.04 | 0.04 | 0.04 | 0.04 |
| HYDROXY PROPYL CELLULOSE | 0 | 0.2 | 0.2 | 0 | 0 |
| HYDROXY PROPYL METHYL CELLULOSE | 0.3 | 0 | 0 | 0.25 | 0.25 |
| VANILLA FLAVOR | 0.1 | 0.1 | 0.1 | 0.1 | 0.1 |
| SALT | 0.14 | 0.14 | 0.14 | 0.14 | 0.14 |

TABLE 2-continued

|  | FORMULATION 1 | FORMULATION 2 | FORMULATION 3 | FORMULATION 4 | FORMULATION 5 |
|---|---|---|---|---|---|
| POTASSIUM SORBATE GRANULAR | 0.1 | 0.1 | 0.1 | 0.1 | 0.1 |
| STRAWBERRY JUICE/SMOOTHIE CONCENTRATE | 0 | 0 | 25 (1) | 0 | 30 (2) |
| WATER | 21.62 | 21.77 | 0.00 | 26.02 | 0.00 |
| CORN SYRUP - HI FRUCTOSE | 52.00 | 52.00 | 48.77 | 52 | 48.02 |
| SSL | 0 | 0.2 | 0.2 | 0 | 0 |
| PGE | 0.1 | 0 | 0 | 0 | 0 |
| LECITHIN | 0.1 | 0 | 0 | 0 | 0 |
| MONO AND DIGLYCERIDES | 0 | 0.1 | 0.1 | 0 | 0 |
| POLYSORBATE 60 | 0.25 | 0.25 | 0.25 | 0.25 | 0.25 |
| SORBITAN MONOSTEARATE | 0 | 0 | 0 | 0.1 | 0.1 |
| pH | 6.8 | 6.7 | 3.3 | 6.8 | 4 |
| aW | 0.875 | 0.875 | 0.9 | 0.89 | 0.92 |

(1) Rich's Strawberry Smoothie Concentrate
(2) Libby's Juicy Juice - Kiwi Strawberry (100% Juice)

TABLE 3

|  | FORMULATION 1 | FORMULATION 2 | FORMULATION 3 | FORMULATION 4 | FORMULATION 5 |
|---|---|---|---|---|---|
| WHIP TIME(min) | 5.5 | 5 | 7 | 6 | 7 |
| OVER RUN (%) | 320 | 310 | 300 | 290 | 280 |
| PENTOMETER(mm) | 36 | 37 | 38 | 39 | 40 |
| BAG TIME (min) | 30 | 45 | 60 | 60 | 60 |
| APPEARANCE ON CAKE AFTER 7 DAYS AT 78 f |  |  |  |  |  |
| ROUGHNESS | SLIGHT | SLIGHT | SLIGHT | MODERATE | MODERATE |
| CRACKING | NONE | NONE | NONE | NONE | NONE |
| COLOR BLEED | 4 MM | 4 MM | 4 MM | 5 MM | 5 MM |
| AIR CELL COALESCENCE | SLIGHT | SLIGHT | SLIGHT | MODERATE | MODERATE |
| SYNERESIS IN BOWL | NONE | NONE | NONE | NONE | NONE |
| TOPPING SAG/BULGING/SLIDING OFF | NONE | NONE | NONE | SLIGHT | SLIGHT |

EXAMPLE 2

This example demonstrates that substitution of the protein by NOSA starch alone did not result in a suitable product. The formulations tested using NOSA starches (from Tate & Lyle) alone are shown in Table 4 below.

TABLE 4

EFFECT OF NOSA STARCH ALONE REPLACING CASEINATE

|  | Control % | F4-673 Starch % | F4-661 Starch % | F4-662 Starch % |
|---|---|---|---|---|
| Palm Kernel Oil (Hard Butter) | 19.46 | 19.46 | 19.46 | 19.46 |
| Soy Oil | 5.04 | 5.04 | 5.04 | 5.04 |
| Lecithin | 0.1 | 0.1 | 0.1 | 0.1 |
| Potassium Sorbate | 0.1 | 0.1 | 0.1 | 0.1 |
| Vanilla Flavor | 0.1 | 0.1 | 0.1 | 0.1 |
| Sugar | 0.15 | 0.15 | 0.15 | 0.15 |
| Xanthan | 0.04 | 0.04 | 0.04 | 0.04 |
| Sodium Caseinate | 1.25 | 0 | 0 | 0 |
| Hydroxypropylmethyl cellulose | 0.3 | 0.3 | 0.3 | 0.3 |
| Salt | 0.14 | 0.14 | 0.14 | 0.14 |
| NOSA starch (F4-673) | 0 | 1.25 | 0 | 0 |
| NOSA starch (F4-661) | 0 | 0 | 1.25 | 0 |
| NOSA starch (F4-662) | 0 | 0 | 0 | 1.25 |
| HFCS | 52.5 | 52.5 | 52.5 | 52.5 |
| Water | 20.39 | 20.39 | 20.39 | 20.39 |
| Polysorbate 60 | 0.28 | 0.28 | 0.28 | 0.28 |
| Polyaldo HGDS (62S) | 0.1 | 0.1 | 0.1 | 0.1 |
| Artificial Vanilla | 0.05 | 0.05 | 0.05 | 0.05 |

The performance of these formulations is shown in Table 5 below.

TABLE 5

Effect Of Nosa Starch Alone Replacing Caseinate

|  | Control | F4-673 Starch | F4-661 Starch | F4-662 Starch |
|---|---|---|---|---|
| Whip Time (Min) | 4.5 | 15 | 15 | 20 |
| Overrun (%) | 288 | 292 | 258 | 247 |
| Viscosity (Cps) |  |  |  |  |
| Penetrometer (Mm/15 sec) | 30 | 50+ | 50+ | 50+ |
| Pastry Bag Use Time At 78 f (Min) | 60 | <10 (Soft) | <10 (Soft) | <10 (Soft) |
| Cake Application | Slightly Firm | Very Soft | Very Soft | Very Soft |
| Appearance On Cake Days At 78 f |  |  |  |  |
| Roughness | Slight | Wet/Shiney Graininess | Wet/Shiney | Wet/Shiney |
| Cracking | None | Slight | Slight | Slight |
| Color Bleed(Mm) | 4 | 4 | 4 | 4 |
| Air Cell Coalescence | Slight | Moderate | Moderate | Moderate |
| Agging/Bulgin/Sliding Off | None | Heavy | Heavy | Heavy |
| Syneresis In Bowl | None | Slight | Heavy | Moderate |

This example demonstrates that replacement of sodium caseinate with NOSA starch, as has been reported for coffee creamers, resulted in a product that was too soft for use as a whipped topping.

EXAMPLE 3

This example demonstrates that supplementing NOSA starch with gelling starch did not result in the generation of a desirable product. The formulations used are shown in Table 6 and their performance is shown in Table 7. As can be seen in Table 7, the whipped product from formulations 1-4 containing NOSA and gelling starch did not perform well with respect to display characteristics on a cake. The control formulation has sodium caseinate.

TABLE 6

Effect Of NOSA Starch With Gelling Starches For Replacing Caseinate

|  | 1 | 2 | 3 | 4 | CONTROL |
|---|---|---|---|---|---|
| Water | 23.76 | 19.76 | 20.75 | 24.75 | 21.14 |
| Polysorbate 60 | 0.28 | 0.28 | 0.28 | 0.28 | 0.28 |
| Corn Syrup Hi Fructose 42 | 52 | 52 | 52 | 52 | 52 |
| Palm Kernel Oil | 21 | 25 | 25 | 21 | 24.5 |
| Lecithin | 0.1 | 0.1 | 0.1 | 0.1 | 0.1 |
| Gelling Starch (Soft Set) | 0 | 0.5 | 0.25 | 0 | 0 |
| Gelling Starch (MIRAGEL 463) | 0.5 | 0 | 0 | 0.25 | 0 |
| NOSA Starch (F4-660) | 0 | 1.75 | 0 | 0.875 | 0 |
| NOSA Starch (STACAP 661) | 1.75 | 0 | 0.875 | 0 | 0 |
| Potassium Sorbate Granular | 0.1 | 0.1 | 0.1 | 0.1 | 0.1 |
| Sodium Caseinate | 0 | 0 | 0 | 0 | 1.24 |
| Xanthan Gum | 0.04 | 0.04 | 0.04 | 0.04 | 0.04 |
| Methocel F50 Food Grade | 0.13 | 0.13 | 0.26 | 0.26 | 0.26 |
| Salt | 0.14 | 0.14 | 0.14 | 0.14 | 0.14 |
| POLYALDO HGDS K | 0.1 | 0.1 | 0.1 | 0.1 | 0.1 |
| Flavor | 0.1 | 0.1 | 0.1 | 0.1 | 0.1 |
| Totals | 100 | 100 | 100 | 100 | 100 |

TABLE 7

PERFORMANCE OF NOSA STARCH WITH GELLING STARCHES FOR REPLACING CASEINATE

|  | 1 | 2 | 3 | 4 | CONTROL |
|---|---|---|---|---|---|
| Whip Time (Min) | 5.5 | 2.6 | 4.6 | 5 | 4.5 |
| Overrun (%) | 269 | 230 | 246 | 286 | 288 |
| Viscosity (Cps) | 1220 | 15000 | 1850 | 1480 | 400 |
| Pastry Bag Use Time At 78 f (Min) | 120 | 120 | 90 | 120 | 60 |
| Cake Application | Slightly Firm | Slightly Firm | Firm | Firm | Slight Firm |
| Appearance On Cake After 7 Days At 78 f |  |  |  |  |  |
| Roughness | Heavy | Moderate | Moderate | Heavy | Slight |
| Cracking | Moderately Heavy | Moderate | Moderate | Moderately Heavy | None |
| Color Bleed (Mm) | 5 | 3 | 5 | 5 | 4 |
| Air Cell Coalescence | Very Heavy | Very Heavy | Very Heavy | Heavy | Slight |
| Sagging/Bulging/Sliding Off | Moderate | Moderate | Moderately Heavy | Moderate | None |
| Syneresis In Bowl | None | None | None | None | None |

EXAMPLE 4

This example demonstrates that the present formulation can be used when using high solids also. The formulations are shown in Table 8 below. The performance is shown in Table 9. As can be seen, the whipped product has acceptable results for the characteristics indicated. Similar results were obtained when the NOSA starch used was STACAP 661, National 912 or Ultrspese 2000 and the hydrophilic starch was LoTemp 452 at a ratio of 4:6.

TABLE 8

EVALUATION OF DIFFERENT NOSA STARCHES IN HIGH SOLIDS FORMULAS

|  | PB6-1 | PB6-2 | PB6-3 | PB6-4 | PB6-5 |
|---|---|---|---|---|---|
| Palm Kernel Oil | 24.5 | 24.5 | 24.5 | 24.5 | 24.5 |
| Sorbitan Monostearate | 0.1 | 0.1 | 0.1 | 0.1 | 0.1 |
| NOSA Starch (NATIONAL 46) | 0 | 0 | 0.4 | 0 | 0 |
| NOSA Starch (N-LOK) | 0 | 0 | 0 | 0.4 | 0 |
| NOSA Starch (NATIONAL 912) | 0 | 0 | 0 | 0 | 0.4 |
| NOSA Starch (HICAP100) | 0.4 | 0 | 0 | 0 | 0.6 |
| NOSA Starch (NCREAMER46) | 0 | 0.4 | 0 | 0 | 0 |
| Hydrophilic Starch (LOTEMP 452) | 0.6 | 0.6 | 0.6 | 0.6 | 0.6 |
| Potassium Sorbate Granular | 0.1 | 0.1 | 0.1 | 0.1 | 0.1 |
| Mv307 Carageenan | 0.1 | 0.1 | 0.1 | 0.1 | 0.1 |
| Methocel F50 Food Grade | 0.25 | 0.25 | 0.25 | 0.25 | 0.25 |
| Vanilla Flavor | 0.1 | 0.1 | 0.1 | 0.1 | 0.1 |

TABLE 8-continued

EVALUATION OF DIFFERENT NOSA STARCHES IN HIGH SOLIDS FORMULAS

|  | PB6-1 | PB6-2 | PB6-3 | PB6-4 | PB6-5 |
|---|---|---|---|---|---|
| Salt Regular | 0.14 | 0.14 | 0.14 | 0.14 | 0.14 |
| Water | 21.41 | 21.41 | 21.41 | 21.41 | 20.81 |
| Corn Syrup Hi Fructose 42 | 52.00 | 52.00 | 52.00 | 52.00 | 52.00 |
| Polysorbate 60 | 0.3 | 0.3 | 0.3 | 0.3 | 0.3 |
| Totals Percent | 100 | 100 | 100 | 100 | 100 |

TABLE 9

Performance Of NOSA Starches In High Solids Formulas

|  | PB6-1 | PB6-2 | PB6-3 | PB6-4 | PB6-5 |
|---|---|---|---|---|---|
| Overrun (%) | 309 | 276 | 333 | 275 | 248 |
| Whip Time (Min) | 5.1 | 4.9 | 6.3 | 4.6 | 3 |
| Cake Application | Firm | Firm | Firm | Firm | Firm |
| Viscosity (Cps) | 426 | 556 | 400 | 480 | 830 |
| Penetrometer (Mm/15 sec) | 54.8 | 41.8 | 50.1 | 44.4 | 42 |
| Pastry Bag Use Time At 78 f (Min) | 30 | 30 | 30 | 30 | 45 |
| Appearance On Cake After 7 Days At 78 f |  |  |  |  |  |
| Color Bleed(Mm) | 4 | 4 | 4 | 3 | 4 |
| Roughness | Smooth | Slight | Smooth | Slight | Slight |
| Sagging/Bulgin/Sliding Off | Slight | Slight | Slight | Slight | Moderate |
| Cracking | Slight | Moderate | Moderate | Slight | Slight |
| Air Cell Coalescence | Moderate | Slight | Slight | None | Slight |
| Syneresis In Bowl | None | None | None | None | None |

EXAMPLE 5

This example described the formulation and performance of whippable product having low solids and low pH. Tables 10 and 12 show the formulations and Table 11 shows the performance of the unwhipped as well as the whipped product of Table 10 and Table 13 shows the performance of the unwhipped as well as the whipped product of Table 11.

TABLE 10

Acidified With Low Solids

|  | Percent |
|---|---|
| Palm Kernel Oil | 24.5 |
| C*EMTEX 12633 - Cargill | 0.4 |
| LOTEMP 452 | 0.6 |
| METHOCEL 100 | 0.4 |
| Vanilla Flavor | 0.1 |
| Dipotassium Phosphate | 0.12 |
| Sugar | 7 |
| Sodium Acid Sulfate | 0.07 |
| Salt Regular | 0.1 |
| Water | 66.25 |
| SSL1 | 0.46 |
| Totals Percent | 100 |

TABLE 11

PERFORMANCE OF ACIDIFIED FORMULATION WITH LOW SOLIDS

|  | Result |
|---|---|
| Overrun (%) | 367 |
| Whip Time (Min) | 6.3 |
| Cake Application | Firm |
| Viscosity (Cps) | 876 |
| Penetrometer (Mm/15 sec) | 49.4 |
| Pastry Bag Use Time At 78 f (Min) | 30 |
| Appearance On Cake After 7 Days At 78 f |  |
| Color Bleed(Mm) | 9 |
| Roughness | Slight |
| Sagging/Bulgin/Sliding Off | None |
| Cracking | Slight |
| Air Cell Coalescence | Slight |
| Syneresis In Bowl | Moderate |

TABLE 12

ACIDIFIED WITH LOW SOLIDS

|  | Percent |
|---|---|
| Palm Kernel Oil | 24.5 |
| NOSA Starch (NATIONAL 46) | 0.4 |
| LOTEMP 452 | 0.6 |
| Potassium Sorbate Granular | 0.1 |
| METHOCEL 100 | 0.4 |
| Vanilla Flavor | 0.1 |
| Dipotassium Phosphate | 0.12 |
| Sugar | 7 |
| Sodium Acid Sulfate | 0.07 |
| Salt Regular | 0.1 |
| Water | 46.15 |
| Corn Syrup Hi Fructose 42 | 20.00 |
| SSL | 0.46 |
| TOTALS PERCENT | 100 |

TABLE 13

PERFORMANCE OF ACIDIFIED FORMULATION WITH LOW SOLIDS

| | |
|---|---|
| Overrun (%) | 398 |
| Whip Time (Min) | 6.2 |
| Cake Application | FIRM |
| Viscosity (Cps) | 650 |
| Penetrometer (Mm/15 sec) | 51.9 |
| Pastry Bag Use Time At 78 f (Min) | 15 |
| Appearance On Cake After 7 Days At 78 f | |
| Color Bleed (Mm) | 3 |
| Roughness | SLIGHT |
| Sagging/Bulgin/Sliding Off | NONE |
| Cracking | NONE |
| Air Cell Coalescence | NONE |
| Syneresis In Bowl | SLIGHT |

The invention claimed is:

1. A pourable whippable oil-in-water food product has less than 0.1% proteins, comprising 10-40 wt % fats, 20-70 wt % water, 10-60 wt % sugar, 0.1 to 3.0 wt % emulsifiers and a starch component, wherein the starch component is present in the range of 0.1 to 4% and comprises octenyl succinic anhydride (NOSA) starch and hydroxypropylated starch ; wherein the NOSA starch and the hydroxypropylated starch are present in the ratio of 1:2 to 2:1, wherein viscosity of the product is from 400 to 1,000 cP, and wherein the product can be stored frozen for at least one year, and can be whipped and the whipped product can be displayed at 25 C. for up to 7 days without any appreciable cracking, weeping, bulging, sagging or sliding off a dessert.

2. The whippable food product of claim 1, wherein the ratio of the NOSA starch and the hydroxypropylated starch is 1:1.5.

3. The whippable food product of claim 1, wherein the pH of the product is between 2.5 and 8.

4. The whippable food product of claim 3, wherein the pH of the product is between 3 and 4.6.

5. The whippable food product of claim 1, further comprising fruit pieces or fruit juices.

6. The whippable food product of claim 5, wherein the fruit pieces or fruit juices are up to 25 wt % and the pH is between 3 and 4.6.

7. The whippable food product of claim 1, further comprising one or more acidulants.

8. The whippable food product of claim 1, wherein the total solids are 55-75 wt %.

9. The whippable food product of claim 8, wherein the water activity is 0.8 to 0.9.

10. The whippable food product of claim 1, wherein the total solids are 35-54 wt %.

11. The whippable food product of claim 10, wherein the water activity is 0.91 to 0.98.

12. A whipped confection made from the whippable food product of claim 1.

13. The whipped confection of claim 12, which has an overrun of between 150 to 500%.

14. The whipped confection of claim 12, wherein the whippable food product further comprises fruit pieces or fruit juices present up to 25 wt % of the whippable product and the pH of the whippable product is between 3 and 4.6.

* * * * *